United States Patent [19]
Roche

[11] 3,913,447
[45] Oct. 21, 1975

[54] ROUTER MITERING-GUIDE
[76] Inventor: Edward Noland Roche, 5 Hickory Hill Road, Cockeysville, Md. 21030
[22] Filed: Oct. 8, 1974
[21] Appl. No.: 513,121

[52] U.S. Cl. .............................. 90/12 D; 144/134 E
[51] Int. Cl.² .......................... B23C 1/20; B27C 5/10
[58] Field of Search ............... 51/170 PT; 90/12 D; 144/134 D, 134 E, 144, 144.5

[56] References Cited
UNITED STATES PATENTS

| | | | |
|---|---|---|---|
| 2,920,663 | 1/1960 | March | 144/134 D X |
| 3,207,193 | 9/1965 | Godfrey | 144/134 D X |
| 3,499,365 | 3/1970 | Needham | 144/134 D X |
| 3,628,579 | 12/1971 | Roche | 144/134 E |

Primary Examiner—Al Lawrence Smith
Assistant Examiner—Gary L. Smith
Attorney, Agent, or Firm—John F. McClellan, Sr.

[57] ABSTRACT

A guide for a powered manual router, including a longitudinally slotted bracket for adjustable attachment of the guide to a router at an angle permitting mitering of high pressure laminate structure, a frame affixed to the angle bracket, a top plate affixed beneath the frame and having an aperture centrally positioned for receipt of the router tool therethrough at a downward and forward angle, a bottom plate having a laterally sliding interconnection with the top plate and having a square-section forward edge transversely positioned beneath the end of the router tool for guiding on workpieces; a pair of clamping bolts secure the bottom plate in any one of three lateral adjustment positions: centered, or to the left or right with the end of the bottom plate tangent the outer portion of the router tool to permit mitering interior corners of hardboard laminates in work such as L-shaped countertops.

9 Claims, 13 Drawing Figures

ROUTER MITERING-GUIDE

This invention relates generally to manual power tools and particularly to manual power tool guide assemblies.

Cross reference is made to my co-pending U.S. Pat. application, Ser. No. 333,122, filed Feb. 16, 1973 now U.S. Pat. No. 3,841,369 for SEAMLESS EDGE LAMINATION APPARATUS on which Notice of Allowance has been received.

A principal object of the present invention is to provide a guide for powered manual routers especially adaptable for mitering interior corners of high pressure laminates such as one-sixteenth inch "Formica" sheet or the like affixed to plywood or chipboard substrate panels. This permits making high quality "seamless" miter joints in L-shaped cabinet tops and the like using only a powered hand-tool. Mitered-edge furniture of the type is unexcelled in appearance if the joints are precise, since the surface finish of the high pressure laminate appears to be continuous at the edge intersections, without the intervening band of different appearance ordinarily caused by exposure of the high pressure laminate core.

In my above mentioned disclosure, a most useful tablemounted miter bevelling power tool is described. In my U.S. Pat. No. 3,628,579, a most useful hand-held angularly-adjustable miter-bevelling power tool is disclosed.

However, neither of the above power tools nor any other discovered in the prior art is adapted for precision mitering at interior corners, in the manner of the present invention.

Other objects are to provide a guide as described which is by design at all times safe and which is made particularly rigid in operation to work to the necessary tolerances, while at the same time being flexibly adapted for use with routers of various manufacturers. A further object is to provide a tool as described which is simple and quick to adjust, easy to use, and economical to manufacture and to purchase.

The above and other objects and advantages of this invention will become more readily apparent on examination of the following description, including the drawing, in which.

In the drawings, like reference numerals designate like parts.

THE PROBLEM

Figure 1:
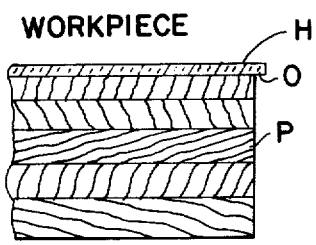
FIGS. 1, 2 and 3 are edge-sections of workpieces.
Figure 2:
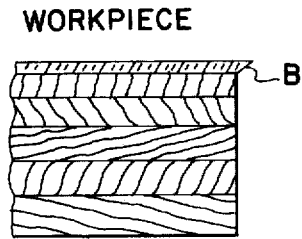
Figure 3:
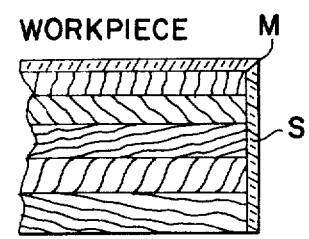

FIGS. 1–3 show workpieces in different illustrative stages of construction. In FIG. 1, a hard plastic or high pressure laminate top sheet H bonded to plywood substrate sheet P has an overhang O. In FIG. 2 the overhang has been miter cut at B. In FIG. 3 the plywood has secured to it an edge covering strip S miter cut and forming a tight miter joint M with the top sheet.

Figure 4:
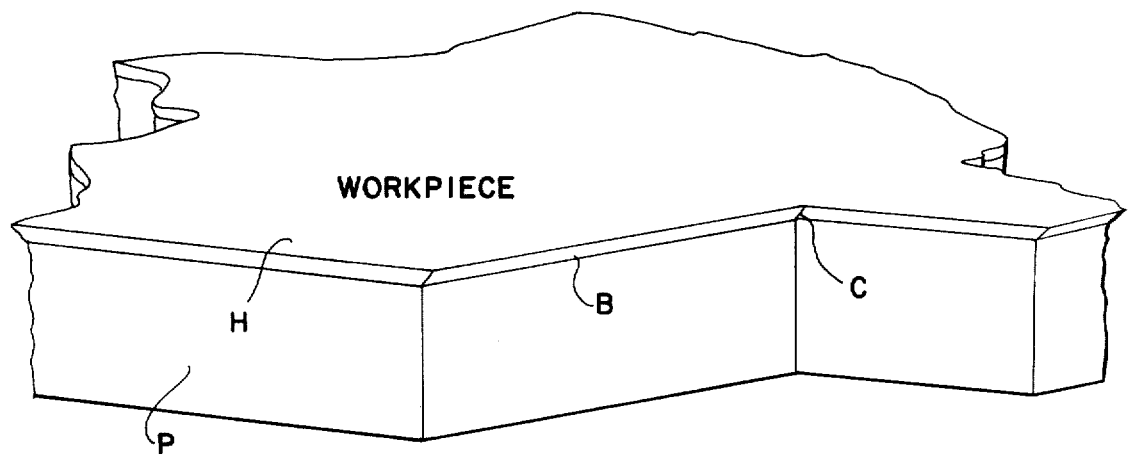
FIG. 4 is an isometric view of a workpiece.

FIG. 4 shows how the difficulties of miter-edging are compounded in fabricating L-shaped workpieces or the like having interior corners C. By necessity the miter faces must extend far enough into the corner to minimize the area to be cleaned up with a file, to prevent bad miter fits. Using a rotary router the router cutter should be guided rigidly at all times so that the cleanup area is never more than a small fraction of the diameter of the smallest practicable router cutter. The effective guide-length should preferably remain the same when mitering interior corners as with other work, to preserve handling feel, and guide alignment should be visible.

With customary routers such precise mitering into interior corners is impossible since the router guides extending to the sides prevent approach to interior corners.

THE INVENTION

The remaining Figures show the tool 10 of this invention and the structure permitting it to hold at the proper angle and to guide mitering routers safety and precisely into interior corners as well as along unobstructed edges and past exterior corners.

Figure 5:
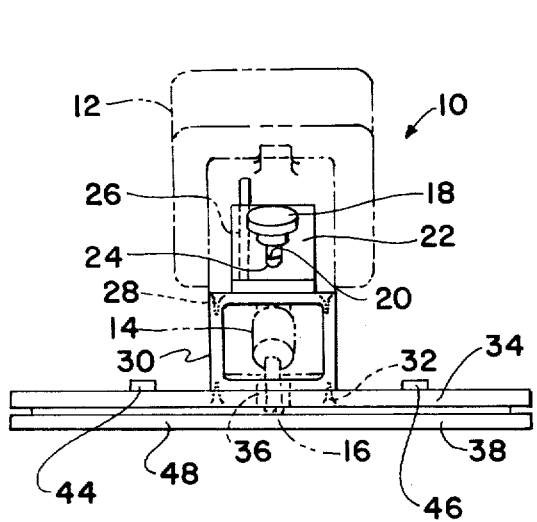
FIGS. 5 and 6 are front and side elevations of the tool of this invention.
Figure 6:
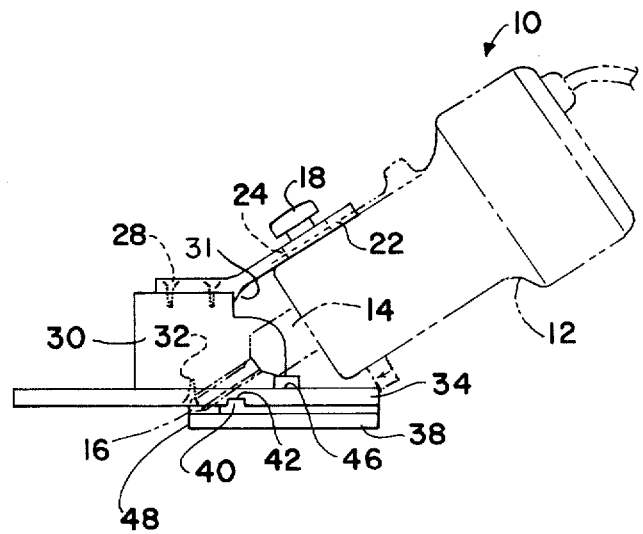
Figure 7:
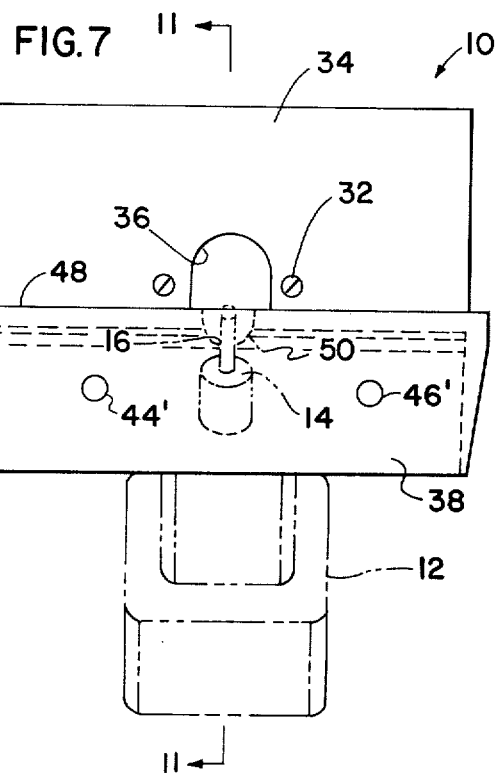
FIG. 7 is a bottom plan view of the tool.

FIGS. 5, 6 and 7 show respectively in front elevation, side elevation, and bottom plan view, in phantom lines, any typical hand-held power router 12, having a chuck 14 holding a generally cylindrical elongate cutter 16 having side cutting flutes.

A thumbscrew 18, threaded into the usual tapped hole 20 (FIG. 5) provided in the router for the purpose, holds the router to a metal bracket 22 at an adjustment slot 24 in the bracket. The bracket has a spline 26 or other arrangement required to fit the aligning structure ordinarily supplied as part of router bodies, usually to form tongue and groove sliding fit mating structure.

To permit the bracket to be removed and another substituted to fit a different router, if necessary, four flathead machine screws 28 detachably but rigidly affix the bracket to the topface of a rigid square-tube metal frame 30 oriented to receive the cutter through one end and to permit viewing the cutter and chuck through the other end. A heel flange 31 squares the bracket with the rear edge of the frame. The bracket has a predetermined angle upward from the square tube. A portion of the router structure may rest against a portion of the assembly of the invention to act as a stop in the axial direction (arrow) automatically setting the depth of cut as indicated.

Machine screws 32 hold the frame to the rectangular shaped top plate 34, of phenolic fibreboard or similar material, and aligned with the rectangular tube but extending past it on all sides.

The cutter which extends through a hole 36 in the top plate, passes downwardly centrally through the top plate at the oblique angle from back to front determined by the bracket angle.

A bottom plate 38 generally laterally coextensive with the rearward portion of the top plate fits to and slidably guides on and keys to the top plate by means of complementary tongue and groove slide structure 40, 42 (FIG. 6) in the two, transverse to the direction of the cutter. A pair of symmetrically located attachment bolts, 44, 46, spaced apart a predetermined distance along a line parallel with the tongue and groove structure, secure together the top plate and bottom plate when the plates are in the center position shown in FIG. 7, threading into the bottom plate at tapped holes 44' and 46'.

The edges of the bottom plate are vertical and the forward edge 48 is parallel with the slide structure and is fixed in a plane intersecting the forwardmost portion of the cutter. A recess 50 below the cutter permits cut material to pass downward from the bottom plate.

Figure 8:
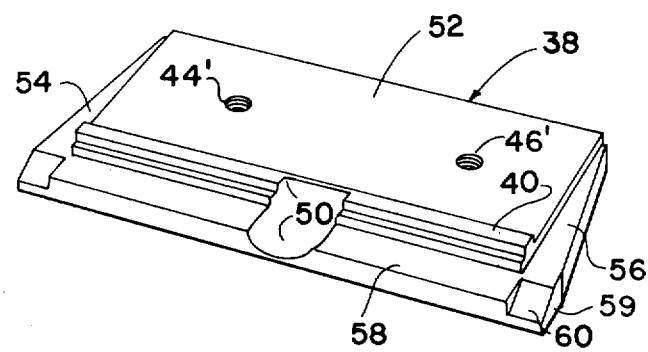
FIG. 8 is an isometric detail of a portion of the tool.

FIG. 8 shows the bottom plate removed, with the top uppermost. The top of the bottom plate has three levels. The tongue 40 for the slide structure is highest. (The groove may be in the bottom plate instead, if desired.) The next level is the plane surface 52 which is drawn against the top plate by the attachment screws. Finally, the end margins 54, 56 and the front margin 58 are stepped down a distance providing clearance for the thickness of sheet material to be miter cut. The end margins are by design rearwardly tapered towards each other, facilitating cutting interior corners, as will be seen. The ends are also rearwardly tapered towards each other to provide clearance except at work-contact pads 59 on the forward corners, which maintain alignment proximate the long guiding face. The pads are parallel and are sized to bridge over saw nicks and the like. Both front corners have bevels 60 for chip clearance when the bottom plate is shifted to one side or the other.

Figure 9:
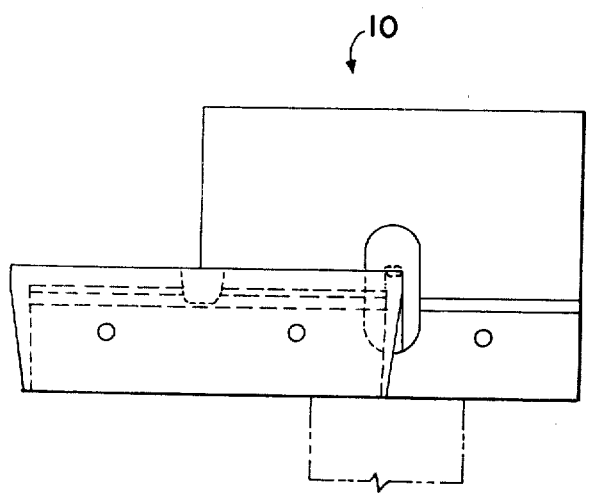
FIGS. 9 and 10 are bottom plan details showing two positions of parts of the tool.
Figure 10:
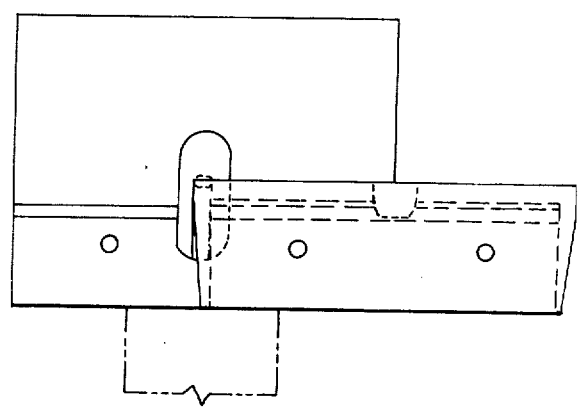

FIGS. 9 and 10 illustrate how the bottom plate can be shifted to either side by removal of the attachment bolts, then rigidly secured by one attachment bolt and the slide after shifting. In the shifted position, the chosen end of the bottom plate is fixed tangent to the outer portion of the cutter to give cutter access to interior corners of work, but to prevent the cutter from gouging the work, and to promote safety.

Figure 11:
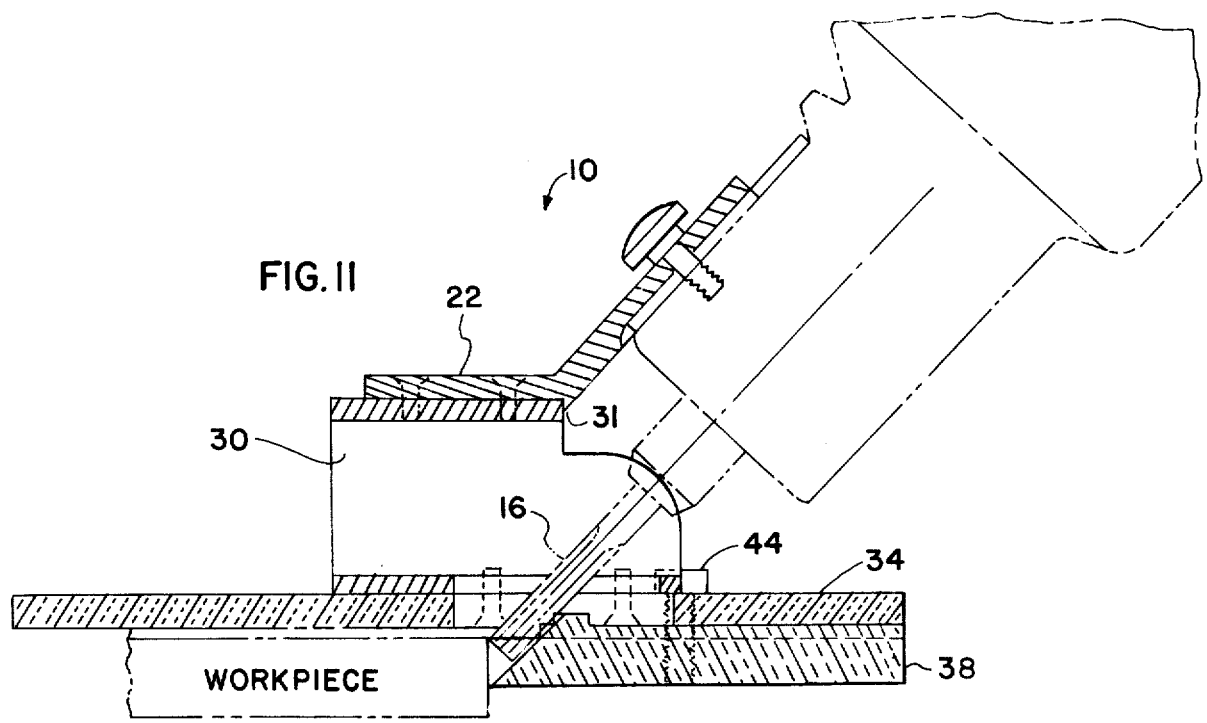
FIG. 11 is a side elevation section of the tool taken at 11—11, FIG. 7, adapted, with a workpiece being mitered shown in phantom lines.

FIG. 11, a centerline sectional detail, shows the tool 10 in position on a workpiece. The cutter is partially guarded by the top plate and by the bottom plate both, no matter whether the bottom plate is in the center position or in one of the shifted positions for bevelling interior corners.

Figure 12:
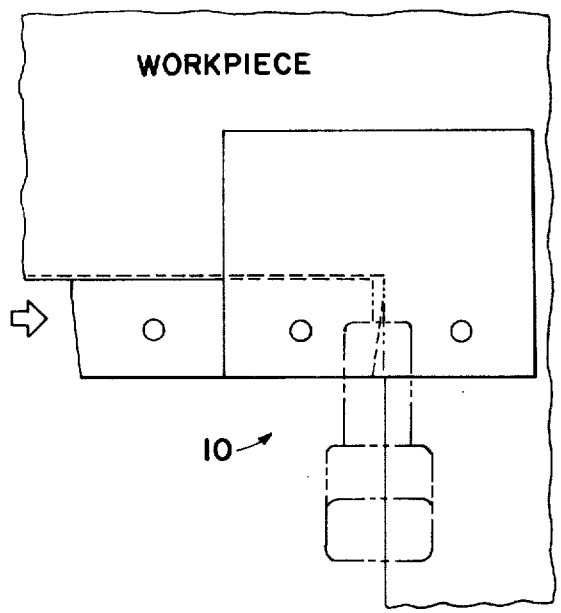
FIGS. 12 and 13 are top plan diagrams of the tool in the two shifted-position adjustments used to bevel respective legs of an L-shaped workpiece.
Figure 13:
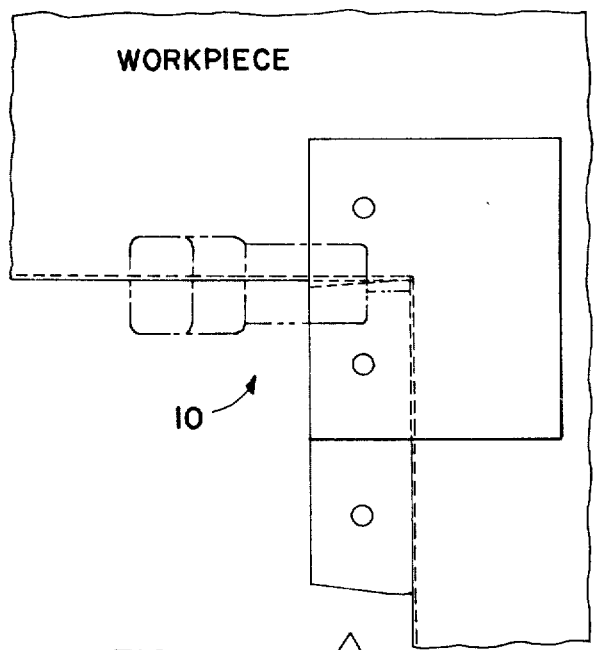

FIGS. 12 and 13 diagram the relations of tool and workpiece and the directions of motion (arrows) when mitering the sides of an L-shaped workpiece or interior corner. The alignment of the guide and the work is visible at all times, and clearance provided by the tapers is evident.

From the foregoing, the great rigidity, safety, economy and ready access afforded by the massive coupling, including the square-section frame and the extensively keyed-together plates, can be seen, together with the nearly foolproof adjustment provisions involving only one clamp screw for depth-setting and two clamp screws for shifting.

Obviously many modifications and variations of the present invention are possible in light of the above teachings. It is, therefore, to be understood that within the scope of the appended claims the invention may be practiced otherwise than as specifically described.

What is claimed and desired to be secured by United States Letters Patent is:

1. In a powered manual router of the type having a body, a sidecutting rotary tool extending from the body, a guide and means on the body for attachment of the guide thereto, said guide comprising: a top plate having an aperture therein, means for attaching the top plate horizontally beneath said a router with a portion of said a router tool extending forwardly and downwardly at an oblique angle through the aperture in the top plate, a bottom plate having: a square-section front edge, a stepped-down margin along a portion thereof adjacently coextensive with the front edge, a first end and a second end; means for securing the bottom plate beneath the top plate with the stepped-down margin providing clearance threrebetween with the front edge centrally transverse to said router tool and the plane of the front edge substantially aligned with the forwardmost extension of the router tool; and means for laterally relocating and for resecuring the bottom plate relative to the top plate in a direction parallel with the plane of said front edge to respective alternate positions placing either the first or the second end of the bottom plate, as desired, in coincidence with the position of a portion of said a router tool.

2. A guide as recited in claim 1, wherein the stepped-down margin coextensive with the front edge continues as a similar stepped down margin adjacent each end of the bottom plate.

3. A guide as recited in claim 2, wherein the stepped-down margins adjacent each end of the bottom plate are rearwardly tapered towards each other.

4. A guide as recited in claim 2, wherein the ends of the bottom plate have respective pad areas proximate said front edge and rearwardly of said pad areas taper towards each other.

5. A guide as recited in claim 2, wherein the means for securing the bottom plate with the front edge centrally transverse to the router tool comprises a pair of clamping members symmetrically laterally spaced about the position of said a router tool.

6. A guide as recited in claim 5, wherein the means for laterally relocating and for resecuring the bottom plate includes inter-engaging sliding structure on the top and bottom plates.

7. A guide as recited in claim 6, wherein the clamping members comprise bolts, each bolt passing through an aperture in one of said plates into an aperture in the other of said plates; and wherein said spacing between the clamping members is proportioned to register an aperture in one said plate with an aperture in the other said plate when the bottom plate is laterally relocated relative to the top plate.

8. A guide as recited in claim 7, wherein the top plate and the bottom plate are substantially laterally coextensive.

9. A guide as recited in claim 7, wherein the means for attaching the top plate to said a router includes an angle bracket for establishing the angle of said a router tool with respect to said top and bottom plates, with a slot therein for adjustable screw-attachment to said a router, a tubular metal frame affixed horizontally to the angle bracket in an orientation to receive said a router tool through a first end thereof and to permit viewing said a router tool through a second end thereof, and means for attaching the tubular metal frame to the top plate.

* * * * *